United States Patent [19]

Zimbardi

[11] 4,092,136

[45] May 30, 1978

[54] AIR FILTERING SYSTEM

[75] Inventor: Dominic J. Zimbardi, Little Valley, N.Y.

[73] Assignees: William D. Farnham; Teddar S. Brooks, both of Little Valley, N.Y.; part interest to each

[21] Appl. No.: 723,078

[22] Filed: Sep. 14, 1976

[51] Int. Cl.² .............................................. B01D 46/46
[52] U.S. Cl. ........................................ 55/212; 55/358; 55/383; 55/385 R; 55/414; 55/467; 55/480; 55/505; 55/511; 98/115 R; 248/311.1 R
[58] Field of Search ...................... 55/212, 210, 385 R, 55/383, 467, 471, 472, 358, 274, DIG. 34, 480, 414, 505, 511; 98/115 R, 115 SB, 43 A; 222/179.5, 189; 239/282, 283, 273, 289, 573; 248/311.1, 310

[56] References Cited

U.S. PATENT DOCUMENTS

| | | | |
|---|---|---|---|
| 2,040,758 | 5/1936 | Naugler | 55/358 X |
| 2,313,676 | 3/1943 | Shaver | 55/471 X |
| 2,371,923 | 3/1945 | Sanford et al. | 98/43 A X |
| 2,602,569 | 7/1952 | Ryan | 239/282 X |
| 2,965,305 | 12/1960 | Glazer et al. | 239/273 X |
| 3,299,960 | 1/1967 | Stern | 239/573 X |
| 3,376,805 | 4/1968 | Deddo et al. | 98/115 R |
| 3,463,436 | 8/1969 | Foster, Jr. | 248/311.1 |
| 3,545,682 | 12/1970 | Beard | 239/573 X |
| 3,642,239 | 2/1972 | Zeiler, Jr. | 248/310 X |
| 3,685,258 | 8/1972 | Kostel et al. | 55/467 X |
| 3,926,103 | 12/1975 | Smith | 98/115 SB |
| 3,988,134 | 10/1976 | Gandrud | 55/467 X |

Primary Examiner—Frank W. Lutter
Assistant Examiner—Kathleen J. Prunner
Attorney, Agent, or Firm—Bean, Kauffman & Bean

[57] ABSTRACT

An air filtering system includes a motor driven exhaust fan operable to draw air through a filter for particulate spray material, support means for supporting a dispenser adapted under operator control to dispense particulate spray material into the air and means responsive to operator removal and return of the dispenser to the support means for energizing and deenergizing the motor, respectively.

2 Claims, 4 Drawing Figures

U.S. Patent
May 30, 1978
4,092,136
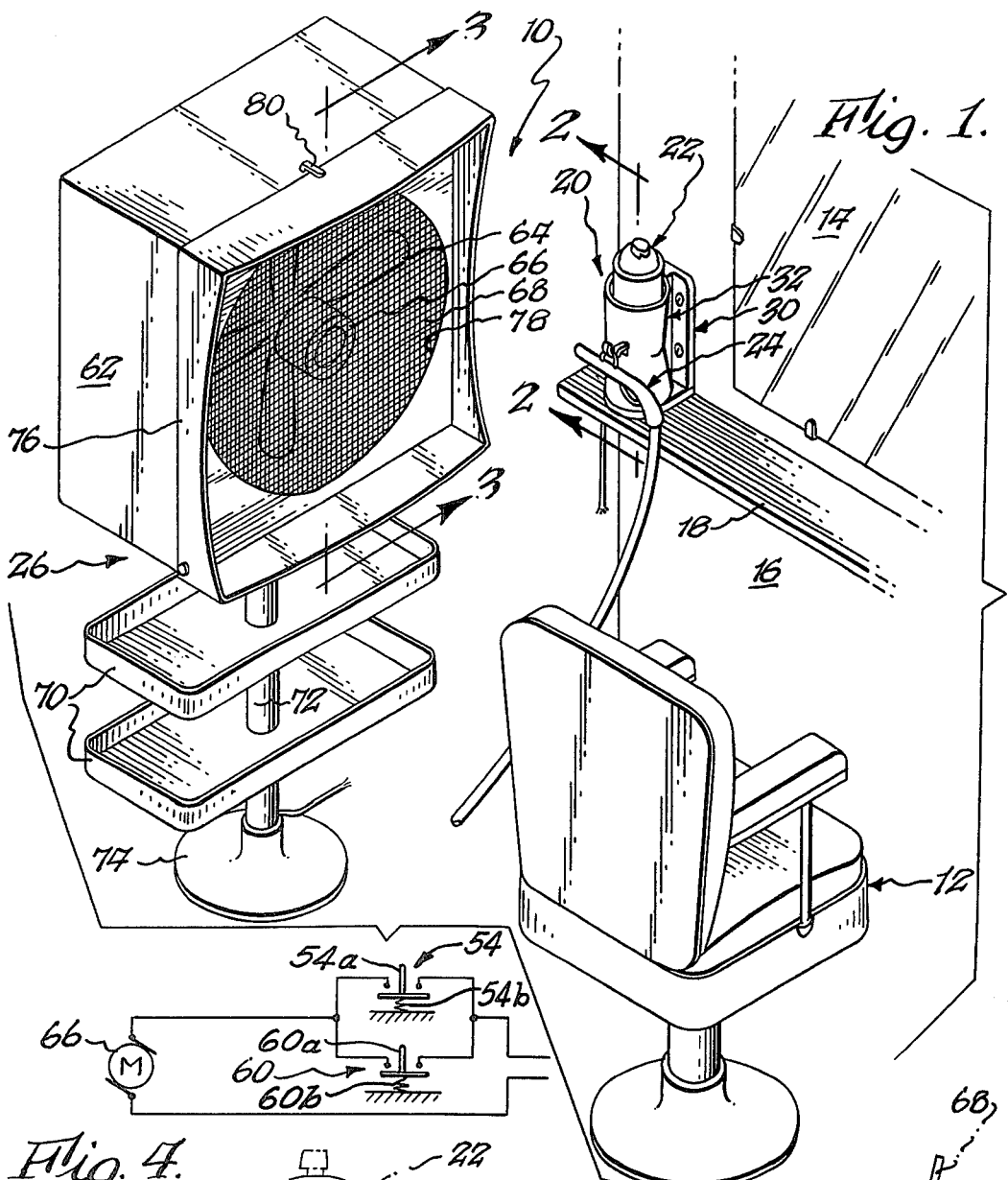
Fig. 1.
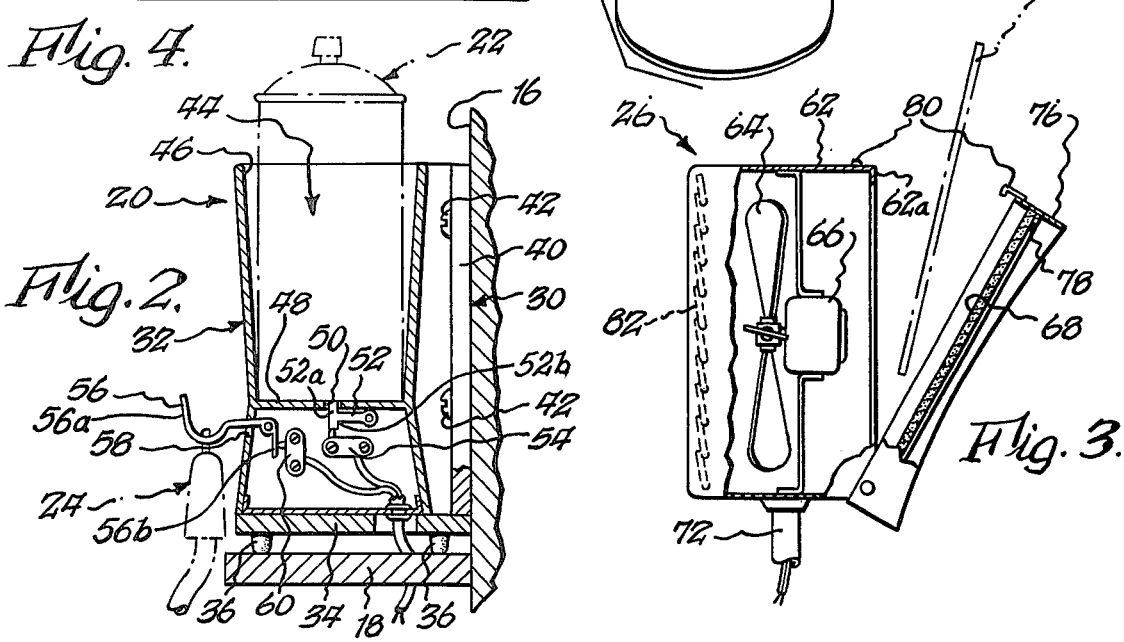
Fig. 4.
Fig. 2.
Fig. 3.

AIR FILTERING SYSTEM

BACKGROUND OF THE INVENTION

Aerosol cans and/or spray guns are now widely used in Beauty and Barber Shops to apply setting and holding agents to hair.

As a practical matter, it is very difficult, if not impossible, to insure that all particulate material in the spray is applied to the hair, and it has been found that a great deal becomes suspended in the air within the shop. The breathing in of this suspended material is often found to be unpleasant by both customers and operators of the shop, and exposure to large amounts of such material over a protracted period of time may prove dangerous to the health of shop operators.

With a view toward partially alleviating the situation, exhaust fans have commonly been used to withdraw shop air contaminated with particulate spray material and discharge same to the outside atmosphere. Conventional exhaust fans are however, expensive to install and difficult to clean. Moreover, such fans are normally run continuously, such that the noise level within the shop is maintained at a high level throughout the working day.

SUMMARY OF THE INVENTION

The present invention is directed towards an air filtering system adapted to remove particulate spray material from air within a Beauty or Barber Shop, while not being subject to the disadvantages of conventional exhaust systems. More particularly, the system of the present invention features the utilization of a floor mounted fan filtering unit, which may be conveniently placed adjacent to a customer whose hair is to be sprayed, and a spray device support unit including electrical switches responsive to operator removal or return of the spray device to the support unit for controlling operation of the fan-filtering unit. Thus, when an operator removes the spray device from its support unit, a fan motor is automatically energized so as to initiate creation of a well defined current of air drawn across the customer and through a filter prior to the initiation of the spraying operation. This current of air is maintained until such time as the operator completes the spraying operation and returns the spray device to the support unit, whereupon the fan motor is automatically deenergized. The filter may be readily removed at the end of the working day or sooner if required for cleaning and/or replacement purposes.

DRAWINGS

FIG. 1 is a perspective view illustrating placement of the air filtering system of the present invention within a Beauty or Barber Shop;

FIG. 2 is a sectional view taken generally along the line 2—2 in FIG. 1;

FIG. 3 is a sectional view taken generally along the line 3—3 in FIG. 1; and

FIG. 4 is a schematic view illustrating a simplified fan motor control system employed in the practice of the present invention.

DETAILED DESCRIPTION

Reference is now made particularly to FIG. 1, wherein an air filtering system formed in accordance with the present invention is generally designated as 10 and shown as being arranged within a Beauty or Barber Shop environment including for instance a customer chair 12 and a mirror 14 mounted on a wall 16 having a shelf or ledge 18. System 10 may be considered as generally including a support unit 20, which is adapted for use in selectively supporting one or more conventional spray dispensing devices, such as an aerosol can type spray dispenser 22 and/or a compressed air type spray gun 24; and a floor mounted fan-filtering unit 26.

Reference is now made to FIGS. 1 and 2, wherein support unit 20 is shown as generally including a generally L-shaped mounting portion 30 and a support casing 32. More specifically, mounting portion 30 is preferably formed with a base 34 having three or more leg-like supports 36, which are adapted to support unit 20 in a free standing relationship on either wall shelf 18 or a cabinet or table, not shown; and an upstanding flange 40, which may be suitably apertured to receive one or more wall mounting fastener devices 42. A mounting portion constructed in this manner permits a shop operator to selectively position support unit 20 at any desired location within the shop.

Support casing 32 is characterized as including an upwardly opening spray can receiving recess or cavity 44, which is sized to partially receive spray can 22 and defined by an upwardly flaired or frusto-conically shaped side wall 46 and a bottom support wall 48. Bottom support wall 48 is formed with aperture 50 sized to freely receive a pivotally supported senser lever 52, which has one leg portion 52a arranged for engagement by the bottom wall of can 22 when inserted within recess 44 and an other leg portion 52b arranged for operative engagement with a suitably supported, normally closed electrical switch 54. Support casing 32 also provides a pivotal support for a spray gun mounting lever 56, which has one leg portion 56a arranged to extend outwardly of the casing through a side wall aperture 58 to define a supporting hook for the spray gun and an other leg portion 56b arranged for operative engagement with a suitably supported, normally closed electrical switch 60. Switches 54 and 60 are shown in FIG. 4 as being of conventional construction in that they include plunger contact operators 54a and 60a and spring devices 54b and 60b, which tend to bias operators into circuit closed condition.

Fan filtering unit 26 is shown in FIGS. 1 and 3 as generally including an open ended casing 62 of generally rectangular cross-section, which serves to house a fan 64 powered by an electric motor 66 and a filter pad or sheet 68, and a plurality of storage shelves 70, which are suitably supported together with casing 62 on a floor mounted standard 72 having a weighted base 74. Casing 62 is best shown in FIG. 3 as having its front end normally closed by a pivotally mounted or hinged front end or cover plate 76, which is formed with a centrally located air inlet opening 78 and adapted to be normally fixed in a closed position by a suitable latch device 80; and as having its rear end closed by an exhaust air diffusion device, such as a louver 82, arranged to direct discharge air from casing 62 in a direction upwardly towards the ceiling of a shop. Filter 68 is preferably of rectangular configuration in order to facilitate mounting thereof within casing 62, as by being releasably, peripherally clamped between cover plate 76 and casing front end rim portion 62a. If desired, louver 82 may be replaced by a filter sheet or pad, not shown, which is intended to supplement operation of filter 68 in addition to providing for diffusion of the current of air created by fan 64.

FIG. 4 illustrates an electrical circuit for use in controlling operation of fan motor 66, wherein normally closed switches 54 and 60 are arranged in a parallel relationship relative to each other and in series with the fan motor. It will be understood that when spray can 22 is supported within recess 44 in engagement with senser lever 52 and spray gun 24 is supported on lever 56, both of switches 54 and 60 are maintained in their circuit open condition against the bias of their spring devices 54b and 60b, such that fan motor 66 is deenergized. However, when a shop operator in preparation of performing a desired spraying operation removes one or the other of these spray devices or dispensers from support unit 20, the internal spring bias of its associated switch is operable to return the switch to its normally closed condition whereby to establish an electrical circuit through fan motor 66 and initiate operation of fan 64. When the previously removed spray device is returned to support unit 20, its associated switch is forced to open against the bias of its internal spring and interrupt the circuit through fan motor 66.

In practice of the present invention, a shop operator would normally place fan filtering unit 26 adjacent chair 12 and on a side thereof opposite to the operator's normal working position, such as is illustrated in FIG. 1 for the case of a right handed operator. Normally, support unit 20 would be placed at any suitable point convenient for the operator to pick up either of spray can 22 or spray gun 24 without moving from normal working position.

As indicated above, when the spray devices are not in use, they would normally be both supported on support unit 20, such that fan motor 66 normally remains in a deenergized condition. When the operator picks up one or the other of the spray devices preparatory of performing a spraying operation, an associated one of switches 54 and 60 is permitted to close and effect energization of fan motor 66. Of course, fan motor 66 is again deenergized when the spray device is returned to support unit 20 at the completion of the spraying operation. Human reaction time is such that short periods of time elapse between removal of the chosen spray device from support unit 20 and the initiation of spraying and between completion of spraying and return of such spray device to the support unit. Thus, operation of fan motor 66 is such as to create a well defined flow or stream of air passing through filter 68, which is available for collecting misdirected or non-applied spray at initiation of the spraying operation, and such stream of air continues for a sufficient period of time after the actual spray operation is completed in order to insure that all mis-directed or non-applied spray is removed from the shop atmosphere by the filter. By judicious selection of the material from which filter 68 is formed, the filter may be of sufficient capacity to require the operator to remove same from casing 62 only at the completion of a working day for cleaning and/or replacement purposes.

While the preferred form of the present invention contemplates that support unit 20 be constructed so as to afford support for both a conventional spray can and spray gun, it would of course be possible to construct the unit so as to accommodate only one of such spray devices in order to satisfy the desires and/or requirements of individual shop operators.

Thus, it will be apparent that a very important advantage flowing from the present air filtering system is that a current of air is only established at the place and at the time actually needed for insuring removal of particulate spray material from the air within the shop.

I claim:

1. An air filtering system for removing particulate material from the air, which comprises in combination:

support means for removably and separately supporting a pair of spray devices adapted under operator control to dispense said particulate material into said air, one of said spray devices being an aerosol can type dispenser and another of said spray devices being a spray gun, said support means including a casing defining an upwardly opening recess sized to receive said dispenser;

a filter for filtering said particulate material from said air when drawn therethrough;

a fan means for drawing air containing said particulate material through said filter;

an electric motor means for operating said fan means; and electrical circuit means for controlling operation of said motor means, said electrical circuit means including sensing means responsive to operator removal and return of said spray devices to said support means for energizing and deenergizing said motor means, respectively, said sensing means being operable to energize said motor means when either of said spray devices is removed from said support means by said operator, and said sensing means includes a pair of electrical switches supported within said casing and a pair of levers operatively associated one with each of said switches and supported for pivotal movement by said casing, a first of said levers having a portion thereof extending into said recess for engagement by said dispenser when received therewithin and a second of said levers having a portion thereof extending through a side wall of said casing and defining a supporting hook for engagement by said spray gun, said switches being normally closed switches forced to assume a circuit open condition by their associated levers upon engagement of said levers by said spray devices.

2. An air filtering system for removing particulate material from the air, which comprises in combination:

support means for removably and separately supporting a pair of spray devices adapted under operator control to dispense said particulate material into said air, one of said spray devices being an aerosol can type dispenser and another of said spray devices being a spray gun, said support means including a casing defining an upwardly opening recess sized to receive said dispenser;

a filter for filtering said particulate material from said air when drawn therethrough;

a fan means for drawing air containing said particulate material through said filter;

an electric motor means for operating said fan means;

a floor standard mounted casing for housing said filter, said fan means and said motor means, the last said casing being open ended and of generally rectangular cross-section, said last said casing hingedly mounting adjacent one end thereof a cover plate movable between open and closed positions and an exhaust air diffusion device adjacent an opposite end thereof, said cover plate being formed with an air inlet opening and cooperating with a rim portion of said one end to removably peripherally clamp said filter therebetween; and electrical circuit means for controlling operation of said motor means, said electrical circuit means including sensing means responsive to operator removal and return of said spray devices to said support means for energizing and deenergizing said motor means, respectively, said sensing means being operable to energize said motor means when either of said spray devices is removed from said support means by said operator and said sensing means includes a pair of electrical switches supported within said casing of said support means and a pair of levers operatively associated one with each of said switches and supported for pivotal movement by said casing of said support means, a first of said levers having a portion thereof extending into said recess for engagement by said dispenser when received therewithin and a second of said levers having a portion thereof extending through a side wall of said casing of said support means and defining a supporting hook for engagement by said spray gun, said switches being normally closed switches forced to assume a circuit open condition by their associated levers upon engagement of said levers by said spray devices.

* * * * *